United States Patent [19]
Stephenson

[11] Patent Number: 5,818,632
[45] Date of Patent: Oct. 6, 1998

[54] MULTI-ELEMENT LENS SYSTEM

[75] Inventor: David Stephenson, Rochester, N.Y.

[73] Assignee: Melles Griot, Inc, Rochester, N.Y.

[21] Appl. No.: 421,174

[22] Filed: Apr. 13, 1995

[51] Int. Cl.[6] .............................. G02B 27/44; G02B 5/18; G01B 9/02; G01B 11/00

[52] U.S. Cl. ........................ 359/565; 359/566; 359/355; 356/345; 356/360

[58] Field of Search .................................. 359/354, 355, 359/356, 357, 565, 566; 356/345, 347, 237, 357, 360

[56] References Cited

U.S. PATENT DOCUMENTS

| | | | |
|---|---|---|---|
| 3,891,975 | 6/1975 | Deml et al. | 359/565 |
| 4,468,122 | 8/1984 | Puryaev | 356/360 |
| 4,594,003 | 6/1986 | Sommargren | 356/349 |
| 4,764,680 | 8/1988 | Geary | 250/560 |
| 5,013,133 | 5/1991 | Buralli et al. | 350/162.11 |
| 5,148,314 | 9/1992 | Chen | 359/642 |
| 5,193,025 | 3/1993 | Carlson et al. | 359/356 |
| 5,349,471 | 9/1994 | Morris et al. | 359/565 |
| 5,442,480 | 8/1995 | Swanson et al. | 359/571 |
| 5,446,588 | 8/1995 | Missig et al. | 359/566 |

*Primary Examiner*—Paul M. Dzierzynski
*Assistant Examiner*—Audrey Chang
*Attorney, Agent, or Firm*—M. Lukacher; K. Lukacher

[57] ABSTRACT

A multi-element refractive/diffractive lens system, especially useful in an interferometer of the Fizeau type for forming a partially reflective end of the cavity and focusing collimated laser light at a focus in the cavity, uses a plurality of lens elements all of which are plano concave or plano convex singlets and may be either spherical or cylindrical. The lens has a diffractive element which compensates for aberrations due to the refractive elements of the lens system and enables the lens system to be formed from relatively few refractive elements which are all plano-convex or plano-concave singlets thereby providing cost savings arising out of the reduction in the amount of glass material and number of lens elements. Since the lens system is especially suitable for use in a Fizeau type interferometer, it may be of the type called a Fizeau lens.

21 Claims, 3 Drawing Sheets

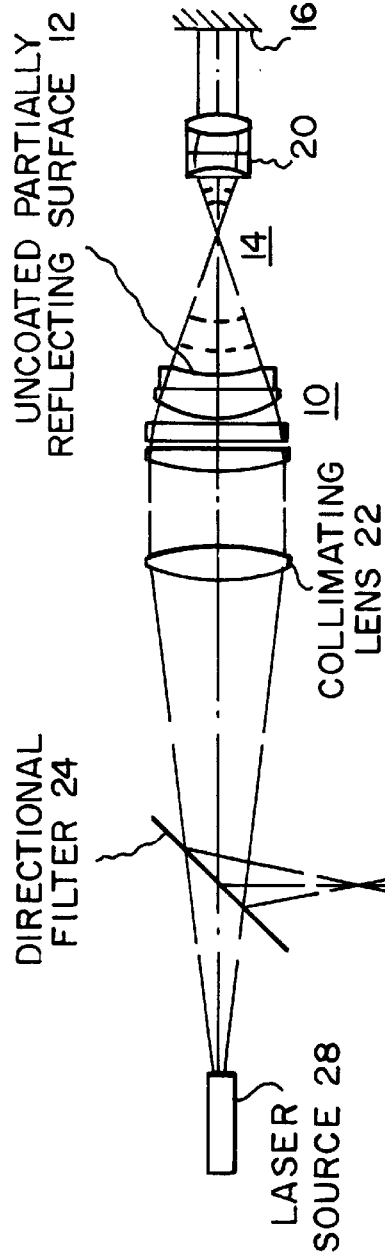
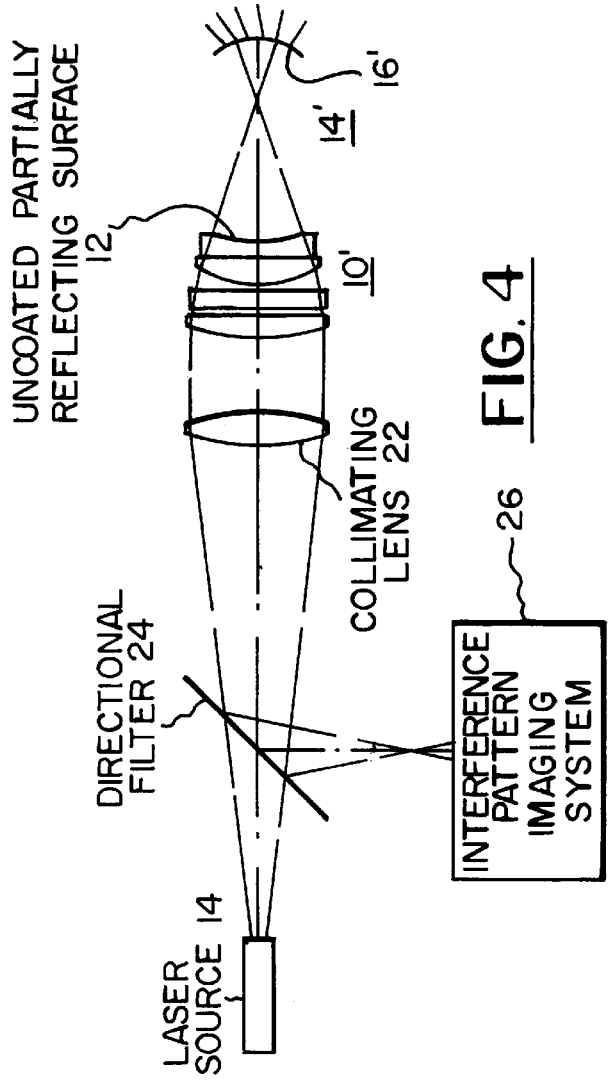

MULTI-ELEMENT LENS SYSTEM

The present invention relates to multi-element optical systems and particularly multi-element optical systems having refractive and diffractive elements.

The invention is especially suitable for use in an interferometer for providing light to an interferometric cavity of the interferometer and forming one end of the cavity. The invention provides an improved Fizeau lens which can form the side of a cavity of a Fizeau interferometer through which light from the laser of the interferometer passes between the front and back surfaces of the lens, the back surface of which faces the cavity and may form the reference surface thereof.

It is the principal feature of this invention to provide an improved multiple element refractive/diffractive hybrid lens system which uses less material (glass) and costs less to manufacture by requiring fewer refractive elements and permitting such refractive elements all to be plano on one surface thereof (plano concave or convex singlets).

Diffractive lenses, particularly zone plate lenses, have heretofore been available and techniques for their manufacture have been described, for example, in U.S. Pat. No. 5,013,133 issued May 7, 1991. Such lenses have been included in refractive and diffractive hybrids whether as refractive/ diffractive doublets or multiple refractive/ diffractive lens systems. See, for example, an article by Faklis and Morris appearing in *Optical Engineering* Jun. 1989, U.S. Pat. No. 5,148,314 issued Sep. 15, 1992 and U.S. Pat. No. 5,349,471 issued Sep. 20, 1994. Presently most Fizeau lenses are complex compound lenses containing several lenses, being generally curved on both sides of each element, in order to obtain the desired gentle bending of light to a focus and desired numerical aperture, for example, relatively low f/#. The present invention obtains optical performance and is suitable for use as a Fizeau lens by utilizing a diffractive element in a manner to enable refractive elements of designs which are simple to manufacture as well as relatively few in number.

Accordingly, it is an object of the present invention to provide an improved multi-element lens system which is capable of providing an input end of a cavity of a Fizeau type of interferometer (a Fizeau lens) which is simpler in design than Fizeau lenses heretofore provided, thereby providing for ease of manufacture and assembly of the lens system with the use of less optical material (glass) and which may be used in other types of interferometers having interferometric cavities, for example, the Twyman-Green type interferometers.

It is a further object of the present invention to provide an improved lens system having only plano-convex and plano-concave elements and a diffractive element or surface, which system is corrected for aberration notwithstanding that it contains relatively few plano concave and convex refractive elements, which may be singlets.

Depending on the method of manufacture, the diffractive element or surface may be called a computer generated hologram, binary optic, grating, kinoform, zone plate, or diffractive surface and are within the scope of this invention. All operate by the identical principle and are equivalent.

It is a further object of the present invention to provide an improved lens system for gently converging a collimated beam, which system has a plurality of elements each of which has a plano surface and which is corrected for aberrations with the aid of a diffractive element in the system.

It is a still further object of the present invention to provide an improved lens system having a plurality of lens elements each of which is plano on a surface thereof and has a diffractive element for correcting aberrations in the system thereby reducing the cost of the system and eliminating the need for symmetrical lens elements and also reducing the number of elements in the system.

It is a still further object of the invention to provide an improved Fizeau lens which is large, for example, approximately about four to six inches in clear aperture diameter, and which is useful for gently bending a beam to a focus as is needed in Fizeau interferometry.

It is a still further object of the present invention to provide an improved lens system having exclusively plano-convex and plano-concave lens elements and a diffractive optical element (DOE) which may be spherical or cylindrical lens elements.

It is a still further object of the present invention to provide an improved multi-element lens system which is made up exclusively of plano-convex and plano-concave refractive lens elements and a DOE and which has a relatively low numerical aperture, e.g., a speed from f/0.65 to f/8; speed or f/# being the reciprocal of numerical aperture NA. It is an important feature of the invention that all elements are either plano-convex or plano-concave. This feature is particularly advantageous for cylindrical interferometer lenses because of manufacturing limitations.

It should be understood that the invention is capable of obtaining one or more of the foregoing objects and features, as well as achieving other objects and having other features and advantages than set forth herein.

Briefly described, a multi-element lens system embodying the invention uses a plurality of lens elements which are disposed successively along an optical axis. The lens system has a front and a back, which are provided by surfaces of the first and last element. The back element may be used to provide a reference surface of an interferometric cavity, particularly a cavity of a Fizeau interferometer, and serves to focus the light from a laser or other source to a position within the cavity. The lens system has a plurality of refractive elements, where light is refracted at each surface. The system also has a DOE which has means controlling light propagation therethrough so as to reduce aberrations without increasing the number of refractive elements. Light is diffracted (rather than refracted) at this surface.

BRIEF DESCRIPTION OF THE DRAWINGS

The foregoing and other objects, features and advantages of the invention as well as presently preferred embodiments thereof will become more apparent from a reading of the following description in connection with the accompanying drawings in which:

FIG. 3 is a schematic diagram of a Fizeau interferometer, utilizing a lens system such as shown in FIGS. 1 and 2 as the Fizeau lens thereof, configured in a way commonly used to test system which are capable of collimating light; and FIG. 4 is a schematic diagram of the cavity of a Fizeau interferometer, utilizing a lens system such as shown in FIGS. 1 and 2 as the Fizeau lens thereof, configured in a way commonly used to test an individual surface rather than an entire system.

DETAILED DESCRIPTION OF THE INVENTION

Figure 1:
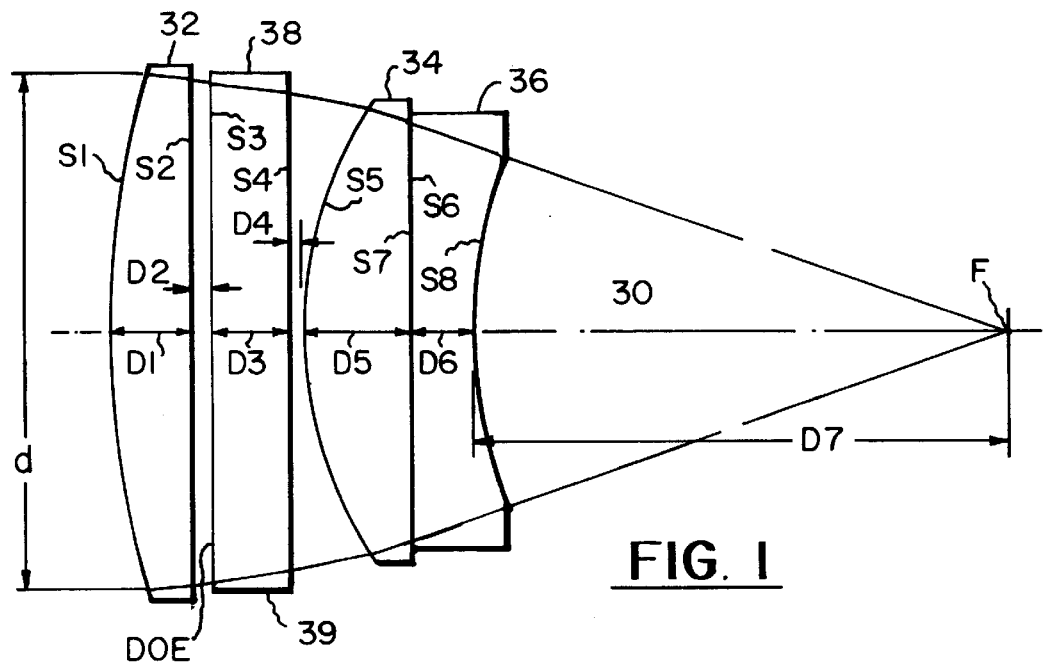
FIG. 1 and FIG. 1A are diagrams of a lens system in accordance with embodiments of the invention (the diagrams are the same for both a spherical and a cylindrical version of the invention)

Referring first to FIG. 3, there is shown a Fizeau interferometer, general information with respect to which may be obtained from U.S. Pat. No. 4,594,003 issued Jun. 10, 1986 and 4,764,680 issued Aug. 16, 1988. The system shown in FIG. 3 has a Fizeau lens system 10 which forms one side and provides a reference surface 12 of a cavity 14 of the interferometer. The other end of the cavity being formed by a mirror 16. Inside the cavity is a device under test 20, (of arbitrary complexity). The device under test collimates the light passing through it and directs it to the reflecting surface 16. The reflected light is returned through the Fizeau lens system 10 and an input collimating lens 22 to the directional filter provided by a partially reflective and partially transmissive beam splitter 24 so as to interfere and form interference patterns in an interference pattern imaging system 26. The light which is used is preferably laser light from a source 28.

Referring next to FIG. 4, here the far end 16' of the test cavity 14' is formed by a surface under test, which may be either concave (as shown), convex, and either spherical or cylindrical.

The Fizeau lens system 10 or 10' may be either cylindrical or spherical. In either case a plurality of refractive and one diffractive optical element or surface are used. All of the refractive elements are plano concave or plano convex singlets. If a spherical system or surface is being tested, a spherical Fizeau lens would be used on the interferometer. If a cylindrical system or surface is being tested, then a cylindrical.

Figure 2:
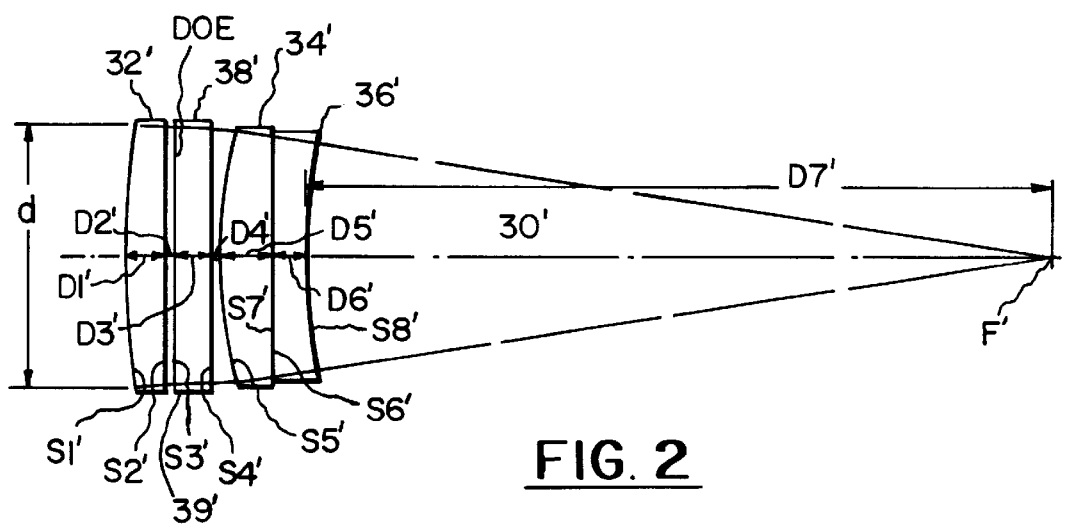
FIG. 2 is a view similar to FIG. 1 of a lens system in accordance with another example of the invention which has a speed of f/3.3, while the system shown in FIG. 1 has a speed of f/1.5, it being understood that minor changes in speed (also known as numerical aperture) of the lens may be provided with lens systems similar to those shown in FIGS. 1 and 2 covering an entire range of numerical apertures, from about f/0.65 to about f/8.
Figure 1A:
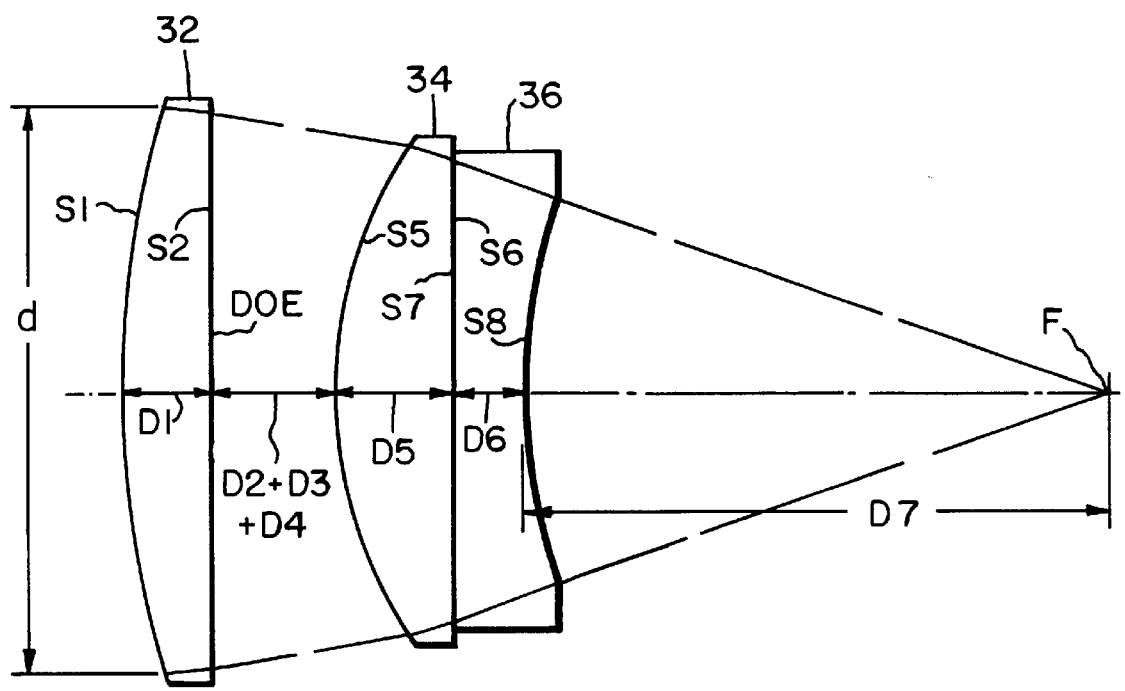

Referring to FIGS. 1 and 2, the elements are disposed along an optical axis 30 and 30'. The front of the lens system is provided by the curved surface S1 or S1' of a refractive piano, convex singlet 32 or 32'. The singlet 32 has a plano surface S2. The other refractive elements 34 and 34' and 36 and 36' are plano-convex and plano-concave, respectively. They have plano surfaces S6 and S7 which are shown in contact. It is possible, but not preferable (since manufacturing of the lens elements 34 and 36 and 34' and 36' would then be more complicated) to form the group made from elements 34 and 36 as a single element. All of the refractive groups have positive power. There is a diffractive element 38 and 38' (DOE) with a blaze annular zone plate on a planoplano window 39 and 39'. The element 38 controls the phase of the light propagating through the system and thereby corrects aberrations due to the refractive surfaces. The window is made of optically transmissive material and is located in the space between the refractive lenses 32 and 34. The DOE may be formed on any of the plano surfaces of the elements. For example, on S2 which is shown in FIG. 1A, however, it is preferable, for ease of manufacturing and for cost considerations, to provide the DOE as a separate element on a transmissive window 38, 38'. The DOE has positive power in the compound lens system.

When used as a Fizeau lens, the concave surface S8 is uncoated while the remaining surfaces of the refractive elements are anti-reflection coated. Then the surface S8, which provides the reference surface of the interferometric cavity is partially reflective.

The lens system brings the collimated rays to a focus F or F'. The rays to the focus are perpendicular to the uncoated surface S8. The clear aperture of the lens system may be large, for example, four inches in diameter, and is the diameter across the spherical lens or the diameter of the cylinder ("d" in FIG. 1). Accordingly, the f/number may be quite low and, for example, may be reduced to f/0.65 thereby providing a very fast lens system.

Examples of lens designs such as shown in FIGS. 1, 1A and 2 are presented, solely for purposes of illustrating the invention and enabling those skilled in the art to use the invention in constructing typical lenses in accordance therewith. Table I is an example of an F/1.5 design shown in FIG. 1, while Table II is an example of an F/3.3 design as shown in FIG. 2.

The location of the zones and the width and blaze thereof is apparent from the coefficients of the phase equation which has ten terms (i=1 to i=10). The phase in waves is defined by the following equation:

$$\phi(r) = \frac{1}{\lambda} \sum_{i=1}^{10} C_i r^{2i}$$

$\phi(r)$ is the phase in waves; $\lambda$ is the design wavelength; C is the coefficient of each of the i terms of the phase equation, and r is the radius as measured from the optical axis which extends through the center of the circular zones in the case of a spherical DOE or the radius of the lines defining the zone segments in the case of a cylindrical DOE.

The exact number of zones and the blaze is preferably obtained using a computer program for the design of lenses, such as "Oslo" which is available from Sinclair Optics, Inc. of Fairport, N.Y. and "Code V" which is available from Optical Research Associates, Pasadena, Calif., through other commercial software codes are also capable of the necessary numerical modeling.

TABLE I

| Radius mm | Phase | Axial thickness mm | Material n:v |
|---|---|---|---|
| 167.97 (S1) |  | 16.90 (D1) | 1.589:61.3 |
| Infinity (S2) |  | 3.91 (D2) | Air |
| Infinity (S3) | r = [0, 49.02 mm] <br> $\lambda$ = 0.0006328 mm <br> $C_1$ = −1.6036 × $10^{-4}$ <br> $C_2$ = +1.9122 × $10^{-8}$ <br> $C_3$ = −5.0864 × $10^{-15}$ <br> $C_4$ = +7.7406 × $10^{-18}$ <br> $C_5$–$C_{10}$ = 0.0 <br> Number of zones: <br> 868 <br> Zone width: <br> 40–582 μm | 15.24 (D3) | 1.458:67.8 |
| Infinity (S4) |  | 2.54 (D4) | Air |
| 81.16 (S5) |  | 21.20 (D5) | 1.517:64.2 |
| Infinity (S6, S7) |  | 12.70 (D6) | 1.458:67.8 |
| 104.76 (S8) |  | 96.30 (D7) | Air |
| S1–S7, AR Coated - S8 Uncoated |  |  |  |

TABLE II

| Radius | Phase* | Axial thickness | Material n:v |
|---|---|---|---|
| 454.482 (S1') |  | 15.55 (D1') | 1.589:61.3 |
| Infinity (S2') |  | 2.54 (D2') | Air 1.0 |
| Infinity (S3') | r = [0, 50.10] | 15.24 (D3') | 1.458:67.8 |

TABLE II-continued

| Radius | Phase* | Axial thickness | Material n:ν |
|---|---|---|---|
| | $\lambda = 0.0006328$ mm | | |
| | $C_1 = -1.4899 \times 10^{-4}$ | | |
| | $C_2 = +1.6506 \times 10^{-9}$ | | |
| | $C_3 = +3.8692 \times 10^{-15}$ | | |
| | $C_4\text{-}C_{10} = 0.0$ | | |
| | Number of zones: 1148 | | |
| | Zone width: 22–604 μm | | |
| Infinity (S4') | | 2.54 (D4') | Air 1.0 |
| 81.16 (S5') | | 19.87 (D5') | 1.517:64.2 |
| Infinity (S6', S7') | | 14.70 (D6') | 1.458:67.8 |
| 104.76 (S8') | | 289.25 (D7') | Air 1.0 |
| S1'–S7', AR Coated - S8' Uncoated | | | |

From the foregoing description, it will be apparent that there has been provided an improved lens system and particularly an improved Fizeau lens which may be used to provide an improved interferometer of the Fizeau type or other types which use a lens as part of the interferometric cavity thereof. Variations and modifications in the herein described lens system will undoubtedly be apparent to those skilled in the art. For example, different materials (glasses) with different index n and abbe or ν number may be selected in order to change the focal length, numerical aperture, diameter or other parameters of the lens system described herein. Accordingly, the foregoing description should be taken as illustrative and not in a limiting sense.

I claim:

1. A multi-element lens system having lens elements disposed successively along an optical axis, said lens system having a front and a back, and said lens elements in combination bringing light entering said system into the front thereof to a focus spaced from the back thereof, said lens system comprising of plurality of first elements which are exclusively plano convex and plano concave lens elements and at least one second element which is disposed along said optical axis as part of said lens system and which is a diffractive optical element (DOE) and which has means of controlling the phase of the light propagating therethrough for reducing aberrations in said refracting surfaces.

2. The lens system according to claim 1 wherein said first elements are singlets which are plano concave or plano convex.

3. The system according to claim 2, wherein said system has a plurality of refractive elements and at least one diffractive element or surface.

4. The system according to claim 2 wherein said system has no more than three first elements and one second element.

5. The system according to claim 1, wherein said elements are either cylindrical or spherical lens elements.

6. The system according to claim 1, wherein said elements are of diameters and curvatures so as to have an f/# between f/0.65 and f/8.

7. The lens system according to claim 1, wherein said elements have diameters of about four inches.

8. The lens system according to claim 1 wherein said first elements have positive power and said at least one second element has negative power.

9. A multi-element lens system having a plurality of lens elements disposed successively along an optical axis, said lens system having a front and a back, and said lens elements in combination bringing light entering said system into the front thereof, to a focus spaced from the back thereof, said lens system comprising a plurality of first elements, and at least one second element which is a diffractive optical element (DOE) and which has means controlling the phase of light propagating therethrough for reducing aberrations in said refracting surfaces, said first elements being singlets which are plano concave or plano convex, said elements, spaced in order along said optical axis from said front to said back are a first plano convex singlet, a second plano convex singlet and a last plano concave singlet, said diffractive element being disposed on a plano surface selected from the plano surfaces of said first elements and a surface on a window of optically transparent material disposed between said first elements thereby providing said second element.

10. The system according to claim 9, wherein said diffractive element is a zone plate lens, kinoform, grating, binary optic, diffractive optic, or computer generated hologram, having a plurality of annular zones and is disposed on the plano surface of said first elements or on said window, which is disposed between said first and second plano convex singlets.

11. The system according to claim 10, wherein said plano surface of said first convex singlet is spaced along the said optical axis from the convex surface of said second convex singlet, and the plano surfaces of said second convex singlet and said concave singlet are in contact with each other.

12. The system according to claim 11, wherein said diffractive element is disposed in the space between said first and second singlets on a surface of a plate of optically transmissive material or on at least one of said (the) plano surfaces.

13. The system according to claim 12, wherein said diffractive element is a blazed zone plate diffractive lens having a plurality of zones radially spaced from said optical axis and forming said surface of said plate or said plano surface of said first convex singlet.

14. The system according to claim 9, wherein the front of said system is the convex surface of said first singlet, and the back of said system is the concave surface of said plano concave singlet.

15. The system according to claim 9, wherein all of said surfaces of said first elements where the light is refracted are anti-reflective coated except for the concave surface of said last plano concave singlet.

16. In an interferometer having a cavity provided by elements having surfaces one of which surfaces is partially reflective, a lens system providing one of said elements and having a focus in said cavity, said lens system comprising a plurality of refractive elements, said plurality of refractive elements being spherical elements or cylindrical elements which are exclusively plano concave or plano convex singlets, one of said refractive elements having a surface which is said partially reflective surface of said cavity, and a diffractive element which reduces aberrations due to said refractive elements.

17. The system according to claim 16, wherein the interferometer is of the Fizeau type.

18. The system according to claim 16, wherein all surfaces are antireflection coated and wherein the interferometer type is of the Twyman-Green type.

19. The system according to claim 16, wherein said partially reflective surface facing said cavity has a concave curvature such that rays of light to the focus are essentially perpendicular to said concave surface.

20. The system according to claim 16, wherein said lens system has no more than three curved surfaces which provide surfaces of said refractive elements.

21. The system according to claim 16, wherein said diffractive element is provided on one of said piano surfaces or a window separate from and disposed between different ones of said refractive elements.

* * * * *